(12) United States Patent
Chhabra

(10) Patent No.: US 7,672,282 B1
(45) Date of Patent: Mar. 2, 2010

(54) BSS SELECTION USING PATH LOSS

(75) Inventor: Kapil Chhabra, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 584 days.

(21) Appl. No.: 11/401,392

(22) Filed: Apr. 10, 2006

Related U.S. Application Data

(60) Provisional application No. 60/738,689, filed on Nov. 21, 2005.

(51) Int. Cl.
*H04W 4/00* (2009.01)

(52) U.S. Cl. ............... 370/338; 455/450; 455/41.2; 455/63.1; 455/513; 455/516; 455/553.1; 455/509; 370/318

(58) Field of Classification Search .......... 455/450, 455/432.1, 41.2, 63.1, 67.11, 513, 516, 509, 455/553.1
See application file for complete search history.

(56) References Cited

U.S. PATENT DOCUMENTS

| 5,809,430 | A * | 9/1998 | D'Amico | 455/525 |
| 6,735,447 | B1 * | 5/2004 | Muller | 455/522 |
| 7,171,230 | B2 * | 1/2007 | Anderson | 455/522 |
| 2002/0168993 | A1 * | 11/2002 | Choi et al. | 455/522 |
| 2005/0195109 | A1 | 9/2005 | Davi et al. | |
| 2005/0249129 | A1 * | 11/2005 | Goodall et al. | 370/252 |
| 2005/0250528 | A1 * | 11/2005 | Song et al. | 455/522 |
| 2006/0046737 | A1 * | 3/2006 | Douglas et al. | 455/452.2 |
| 2006/0142004 | A1 * | 6/2006 | He et al. | 455/434 |
| 2006/0200862 | A1 * | 9/2006 | Olson et al. | 726/23 |

OTHER PUBLICATIONS

IEEE Std 802.11h-2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

* cited by examiner

*Primary Examiner*—Charles N Appiah
*Assistant Examiner*—Kwasi Karikari

(57) ABSTRACT

A wireless client station includes a received signal strength module to estimate N signal strengths of N signals received by the wireless client station from N access points, respectively, where N is an integer greater than one. The wireless client station further includes a control module to determine N path losses based on the N signal strengths and N transmit power signals included in the N signals. The control module selects and associates with one of the N access points based on a lowest one of the N path losses. The control module adjusts a minimum transmit power of the wireless client station based on a sum of the lowest one of the N path losses and a receiver sensitivity of the wireless client station.

18 Claims, 7 Drawing Sheets

|   | 201 | 202 | 203 |
|---|---|---|---|
|   | Field Name | Type | Description |
| 213 | CmdCode | UINT16 | CMD_802_11H_TPC_ENABLE |
| 214 | Size | UINT16 | Number of Bytes in Command Body |
| 215 | SeqNum | UINT16 | Command Sequence Number |
| 216 | Result | UINT16 | Not Used (Set to 0) |
| 217 | Action | UINT8 | Enable/Disable 11h TPC Algorithm<br>ACT_ENABLE<br>ACT_DISABLE |
| 218 | Transmit Power Delta | UINT8 | This refers to power (in dBm), $\Delta_{TX}$, the STA should use in excess of minimum power ($Tx_{min}$) |
| 219 | Path Loss Trigger Threshold | UINT8 | This refers to the change (in dBm), $\Delta_{PathLoss}$, in Path Loss that would trigger TPC Adaptation every beacon period. |

FIG. 9A

|   | 201 | 202 | 203 |
|---|---|---|---|
|   | Field Name | Type | Description |
| 213 | CmdCode | UINT16 | CMD_802_11H_TPC_ENABLE |
| 214 | Size | UINT16 | Number of Bytes in Command Body |
| 215 | SeqNum | UINT16 | Command Sequence Number |
| 216 | Result | UINT16 | Result |
| 217 | Action | UINT8 | Enable/Disable 11h TPC Algorithm<br>ACT_ENABLE<br>ACT_DISABLE |
| 218 | Transmit Power Delta | UINT8 | This refers to power (in dBm), $\Delta_{TX}$, the STA should use in excess of minimum power ($Tx_{min}$) |
| 219 | Path Loss Trigger Threshold | UINT8 | This refers to the change (in dBm), $\Delta_{PathLoss}$, in Path Loss that would trigger TPC Adaptation every beacon period. |

FIG. 9B ized Application No. 60/738,689, filed on Nov. 21, 2005. The

BSS SELECTION USING PATH LOSS

CROSS-REFERENCE TO RELATED APPLICATIONS

This application claims the benefit of U.S. Provisional Application No. 60/738,689, filed on Nov. 21, 2005. The disclosure of the above application is incorporated herein by reference. This application is related to "Transmit Power Adaptation Algorithm Using 802.11H", U.S. patent application Ser. No. 11/400,982, filed Apr. 10, 2006, which is hereby incorporated by reference in its entirety.

FIELD

The present disclosure relates to wireless network devices.

BACKGROUND

A wireless local area network (WLAN) provides a wireless station (STA), such as a laptop computer and/or networked appliance, with a wireless connection to a computer network. The STA includes a WLAN transceiver that sends and receives packets. An access point (AP) also includes a WLAN transceiver that sends and receives the packets and provides a communication bridge between the STA and the computer network.

In some instances more than one AP is available for providing the STA with access to the computer network. The STA must then decide which AP to associate with. Since many STAs are portable and powered by batteries, it is prudent for the STA to consider battery life when choosing between the available APs. In some systems the STA monitors a received signal strength indicator (RSSI) associated with signals received from each of the APs. The STA then associates with the AP having the strongest RSSI. This approach assumes that the RSSI provides an indication of the distance and/or proximity of the STA to the AP. The STA then assumes it can have a better quality communication path (e.g. lower signal loss and/or higher signal-to-noise ratio) with the AP having the highest RSSI. Under this assumption the STA would conserve battery power by not having to resend packets that are dropped.

Referring now to FIG. 1, a functional block diagram is shown of a WLAN 10. WLAN 10 includes a STA 12 that employs the RSSI approach described above. STA 12 can connect to a distributed communications system (DCS) 14 such as the Internet through one of a first AP 16-1 and a second AP 16-2. The first AP 16-1 may be located 100 meters from STA 12 and have a radiated power of 10 decibels over 1 milliwatt (10 dB$_m$). The second AP 16-2 may be located 200 meters from STA 12 and have a radiated power of 18 dB$_m$.

Assuming free space propagation, the relation between RSSI in dB$_m$ (Rx) and transmitted power in dB$_m$ (Tx) at 5 Ghz, can be expressed as:

$$Rx(D) = Tx - 46.42 - 20 \log D, \quad (Eq.1)$$

where D represents the distance in meters between the transmitter and the receiver. The number 46.42 is a correction factor on the free-space path loss and is based on known equations and factors such as the frequency of interest, conductor losses, and anticipated antenna gains.

As is shown below, Eq. 1 can be used to determine Rx values between STA 12 and each of first AP 16-1 and second AP 16-2.

$$Rx_{AP1} = 10 \text{ dB}_m - 46.42 - 20 \log 100 \text{ m} = -76.42 \text{ dB}_m,$$

and $$Rx_{AP2} = 18 \text{ dB}_m - 46.42 - 20 \log 200 \text{ m} = -74.44 \text{ dB}_m.$$

Since $Rx_{AP2} > Rx_{AP1}$, STA 12 will generate a stronger RSSI for second AP 16-2. STA 12 will therefore associate with second AP 16-2 even though second AP 16-2 is further from STA 12 than first AP 16-1. This means that STA 12 will consume more power transmitting to second AP 16-2 than it would have consumed transmitting to first AP 16-1.

SUMMARY

A wireless client station includes a received signal strength module that estimates signal strengths of N signals received by the client station from N access points, where N is an integer greater than one. A control module determines N path losses based on the N signal strengths and N transmit power signals included in the N signals. The control module selects and associates with one of the access points based on the path losses.

In other features the N path losses are based corresponding ones of the N transmit power signals and the N signal strengths, respectively. The control module selects and associates the STA with the access point corresponding to a lowest one of the N path losses. The N transmit power signals are otherwise compliant with the Institute of Electrical and Electronics Engineers (IEEE) standard 802.11h. Each of the N signal strengths are greater than a predetermined signal strength threshold. A wireless network includes the wireless client station and N access points. The wireless client station communicates with the N access points using a transmit power control protocol. The wireless client station includes a medium access control (MAC) module. The control module is implemented by the MAC module. The wireless client station includes a physical layer (PHY) module that provides an interface with a wireless medium and a medium access control (MAC) module that communicates with the PHY module. The received signal strength module is implemented in at least one of the PHY module and the MAC module.

A method of operating a wireless client station includes estimating signal strengths of N signals received by the wireless client station from N access points, where N is an integer greater than one. The method includes determining N path losses based on the N signal strengths and N transmit power signals included in the N signals and associating with one of the access points based on the path losses.

In other features the N path losses are based corresponding ones of the N transmit power signals and the N signal strengths, respectively. The associating step associates the wireless client station with the access point corresponding to a lowest one of the N path losses. The N transmit power signals are otherwise compliant with the Institute of Electrical and Electronics Engineers (IEEE) standard 802.11h. Each of the N signal strengths are greater than a predetermined signal strength threshold. The method includes communicating with the N access points via a transmit power control protocol.

A computer program stored on a tangible computer medium for operating a wireless client station includes estimating signal strengths of N signals received by the wireless client station from N access points, where N is an integer greater than one. The computer program includes determining N path losses based on the N signal strengths and N transmit power signals included in the N signals and associating with one of the access points based on the path losses.

In other features the N path losses are based corresponding ones of the N transmit power signals and the N signal strengths, respectively. The associating step associates the wireless client station with the access point corresponding to a lowest one of the N path losses. Each of the N signal strengths are greater than a predetermined signal strength threshold. The computer program includes communicating with the N access points via a transmit power control protocol.

A wireless client station includes received signal strength means for estimating signal strengths of N signals received by the wireless client station from N access point means, where N is an integer greater than one. The wireless client station also includes control means for determining N path losses based on the N signal strengths and N transmit power signals included in the N signals. The control means selects and associates with one of the access point means based on the path losses.

In other features the N path losses are based corresponding ones of the N transmit power signals and the N signal strengths, respectively. The control means selects and associates the STA with the access point means corresponding to a lowest one of the N path losses. The N transmit power signals are otherwise compliant with the Institute of Electrical and Electronics Engineers (IEEE) standard 802.11h. Each of the N signal strengths are greater than a predetermined signal strength threshold. A wireless network includes the wireless client station and N access point means. The wireless client station communicates with the N access point means using a transmit power control protocol. The wireless client station includes physical layer (PHY) means for providing an interface with a wireless medium and medium access control (MAC) means for communicating with the PHY means. The received signal strength means is implemented in at least one of the PHY means and the MAC means.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a flowchart of a method for choosing an AP to associate with;

FIG. 9A is a table of API message fields in a transmit power control configuration message;

FIG. 9B is a table of API message fields in a transmit power control configuration response;

DETAILED DESCRIPTION

Figure 1:
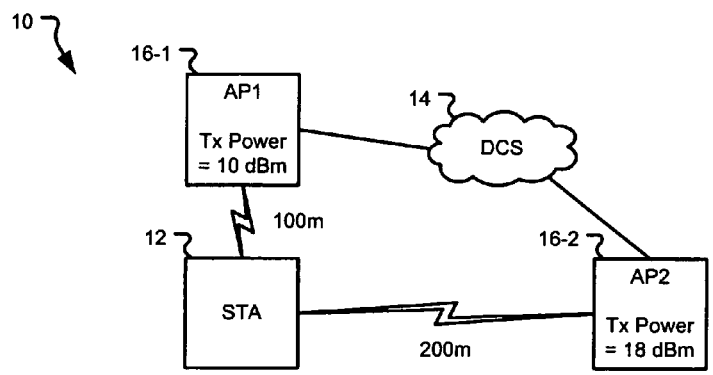
FIG. 1 is a functional block diagram of a WLAN of the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 2:
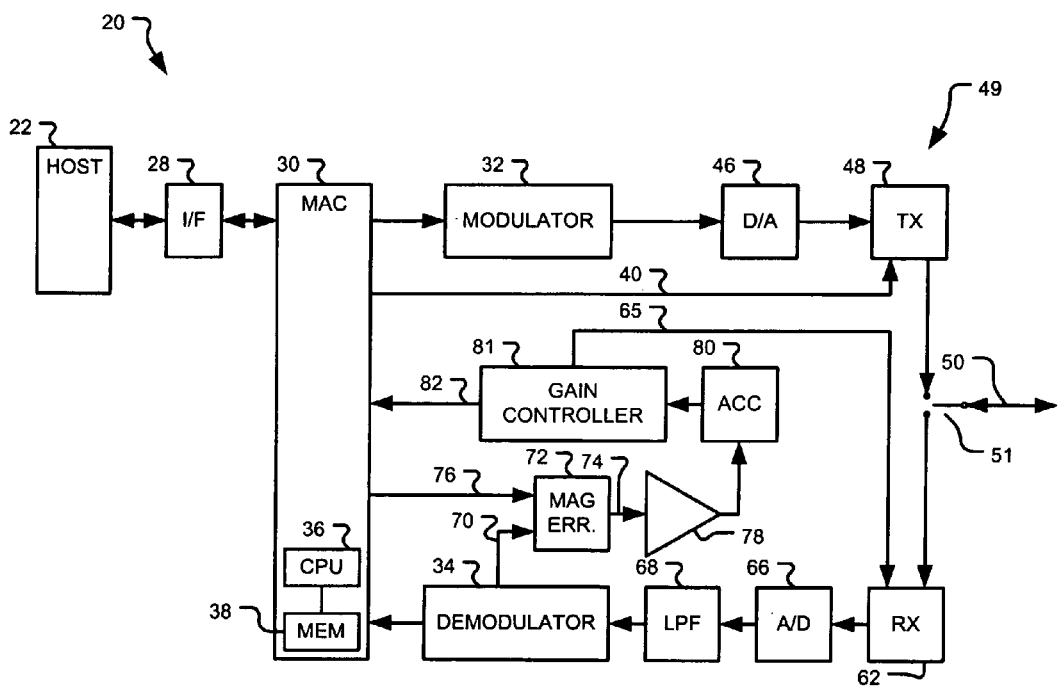
FIG. 2 is a functional block diagram of a WLAN STA.

Referring now to FIG. 2, a STA 20 communicates with a host 22. By way of non-limiting example, host 22 can be implemented in a laptop computer, personal digital assistant, voice-over-internet protocol (VoIP) telephone, and/or other devices that communicate in a WLAN.

An interface 28 provides a communication bridge between host 22 and a media access controller (MAC) 30. MAC 30 forms data from host 22 into packets and communicates the packets to a modulator 32. MAC 30 also extracts data from packets that it receives from a demodulator 34. MAC 30 communicates the extracted data to host 22 via interface 28.

MAC 30 includes a central processing unit (CPU) 36 and associated memory 38. In addition to performing the data and packet operations described above, CPU 36 executes computer instructions that associate STA 20 with one of several access points (APs) 102 (shown in FIG. 3). CPU 36 also executes computer instructions that control a transmit power signal 40.

A transmit portion of STA 20 includes modulator 32 which digitally modulates the packets and communicates them to a digital-to-analog converter (D/A) 46. D/A 46 generates an analog modulating signal that is communicated to an RF transmitter 48. RF transmitter 48 generates one or more modulated RF carriers based on the analog signal and applies the modulated RF carrier(s) to one pole of a digitally-controlled switch 51. A common terminal of switch 51 communicates with a feed line 50 that connects to an antenna (not shown). The RF transmitter and RF receiver form part of a physical layer (PHY) module 49 of the STA 20.

A receive portion of STA 20 receives modulated RF carrier(s) from the antenna through a second pole of switch 51. These modulated RF carrier(s) are transmitted by APs 102 (see FIG. 3) and/or other STAs. The other STAs can be configured differently than STA 20. The modulated RF carrier(s) are communicated to a receiver 62. Receiver 62 generates a modulated signal based on data included in the received modulated RF carrier(s). An amplitude of the modulated signal is based on a gain control signal 65 that is generated by a gain controller 81. The modulated signal is communicated to an analog-to-digital converter (A/D) 66 that generates modulated digital data based on the modulated signal. The modulated digital data is filtered by a low-pass filter 68 before being communicated to an input of demodulator 34. Demodulator 34 generates packets based on the filtered and modulated digital data and communicates the packets to MAC 30.

Demodulator 34 also generates a gain signal 70 based on the output of low-pass filter 68. An error amplifier 72 generates an error signal 74 based on a difference between gain signal 70 and a desired gain signal 76 that is generated by MAC 30. An amplifier 78 amplifies the error signal 74 and communicates an amplified error signal to an accumulator 80. Accumulator 80 integrates and/or differentiates the amplified error signal and generates an accumulated error signal that is communicated to an input of gain controller 81. Gain controller 81 then generates the gain control signal 65 and an RSSI signal 82 based on the accumulated error signal.

Figure 3:
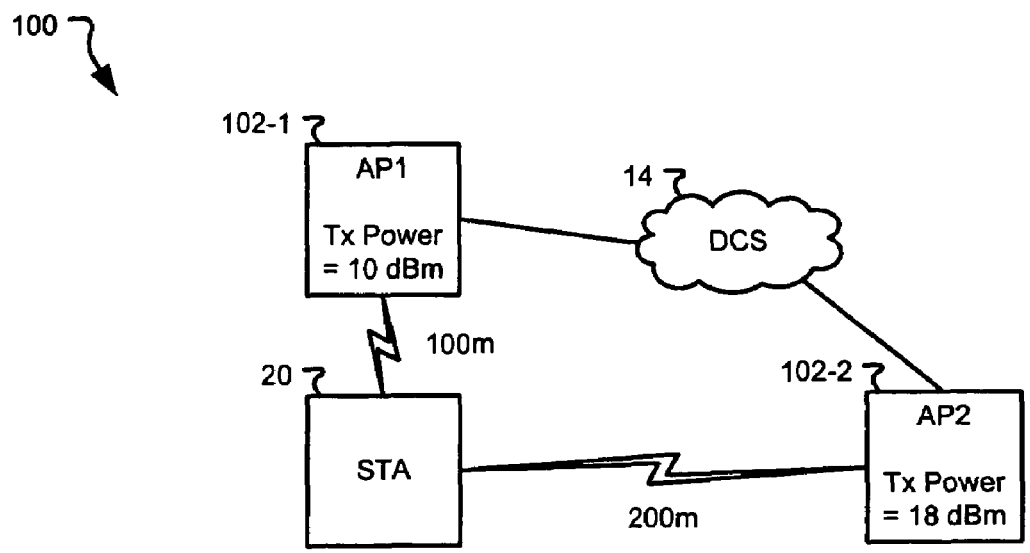
FIG. 3 is functional block diagram of a WLAN that includes the STA of FIG. 2.

Referring now to FIG. 3, a functional block diagram is shown of a WLAN 100 that includes improved STA 20. STA 20 can connect to DCS 14 through one of a first AP 102-1 and a second AP 102-2, collectively referred to as APs 102. Each of APs 102 are compliant with a transmit power control (TPC) protocol. The TPC protocol includes data regarding the RF power being dissipated by the transmitting station. The data can be included in a beacon signal and/or a response to a TPC request from another STA 20.

Figure 4:
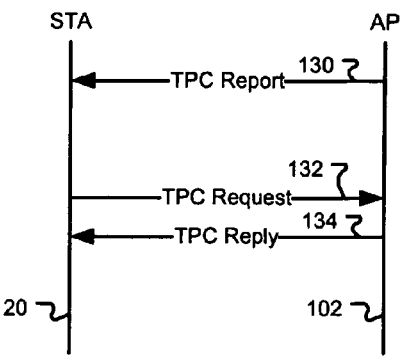
FIG. 4 is a protocol diagram of messages related to transmit power.

Referring briefly to FIG. 4, a protocol diagram shows two methods that STA 20 and APs 102 use to implement the TPC protocol. The second of the two methods also allows APs 102 to transmit respective link margin data to STA 20. The link margins correspond to the communication paths between the APs 102 and STA 20.

In the first method, AP 102 broadcasts a beacon message that includes a transmit power control (TPC) report 130. TPC report 130 includes the transmitter RF power data of the transmitting AP 102.

In the second method, STA 20 sends a TPC request 132 to one of the APs 102. The TPC request 132 includes the transmitter RF power data of STA 20. Each AP 102 responds to TPC request 132 by sending a TPC reply 134. TPC reply 134 includes the transmitter RF power data of the sending AP 102 and also a link margin between STA 20 and the sending AP 102. In some embodiments TPC report 130, TPC request 132, and TPC reply 134, collectively referred to as TPC messages, are compliant with the Institute of Electrical and Electronics Engineers (IEEE) 802.11h specification, which is hereby incorporated by reference in its entirety.

Returning now to FIG. 3, STA 20 uses the RF power data in the TPC report 130 and/or TPC reply 134 to determine respective path losses in the communication paths between STA 20 and APs 102. STA 20 then associates with the AP 102 that has the lowest path loss.

Path loss (PL) in $dB_m$ can be determined from the equation:

$$PL = Tx - Rx, \quad (Eq. 2)$$

where Tx is the RF power in $dB_m$ at the transmitter and Rx is based on the received power as indicated by RSSI signal 82. Eq. 2 can be implemented as computer instructions in memory 38 and executed by CPU 36.

Example path loss calculations will now be provided that include the values shown in FIG. 3. Assuming APs 102-1 and 102-2 are transmitting 10 $dB_m$ and 18 $dB_m$ of RF power respectively, then Eq. 1 shows that RSSI signal 82 indicates Rx=−76.42 $dB_m$ for first AP 102-1 and Rx=−74.44 $dB_m$ for second AP 102-2. The path losses between STA 20 and APs 62 can then be determined from Eq. 2 as follows:

$$P_{LAP1} = 10\ dB_m - (-76.42\ dB_m) = 86.42\ dB_m \text{ and}$$

$$P_{LAP2} = 18\ dB_m - (-74.44\ dB_m) = 92.44\ dB_m.$$

For simplicity, small scale effects and multi-path fading are not taken into account in the analysis above. The affect of distance becomes more pronounced when fading is taken into account. A similar conclusion can be reached at in presence of multipath fading.

Figure 5:
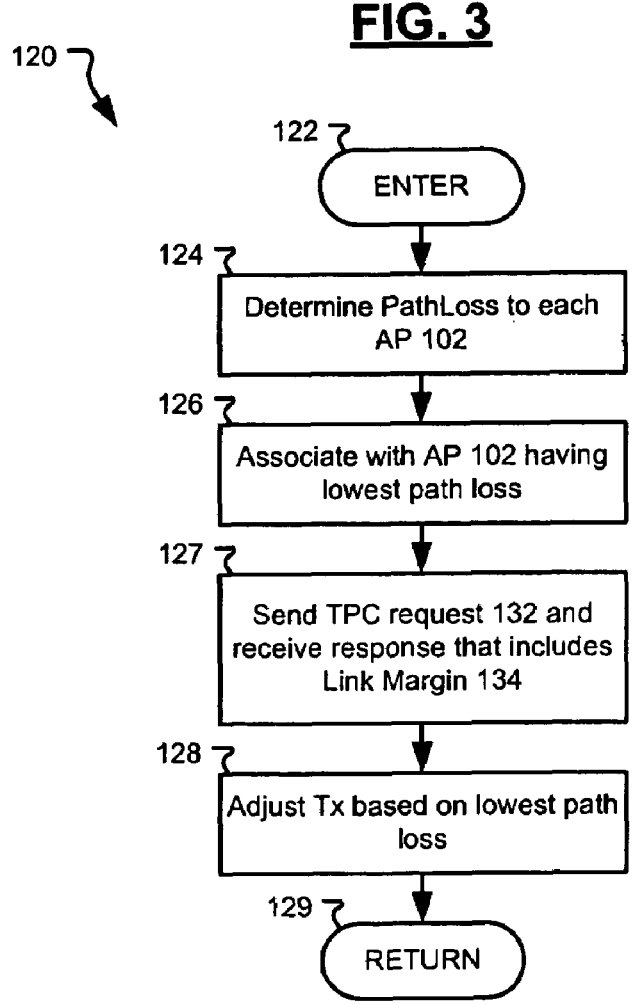

Referring now to FIG. 5, a method 120 is shown for determining which of several APs 102 that STA 20 should associate with. Method 120 can be implemented as computer instructions stored in memory 38 and executed by CPU 36. Method 120 can be executed each time STA 20 receives a TPC report 130 and/or TPC reply 134.

Method 120 enters through block 122 and proceeds to block 124. In block 124, control determines respective path losses between STA 20 and APs 102 that transmit TPC reports 130 and/or TPC replies 134. Control then proceeds to block 126 and associates STA 20 with the available AP 102 corresponding to the lowest path loss. Control then proceeds to block 127 and transmits a TPC request 132 (shown in FIG. 4). In response to TPC request 132, the associated AP 102 sends a TPC reply 134 that includes a Link Margin. Link Margin is described below. Control then proceeds to block 128 and uses transmit power signal 40 to adjust transmitter RF power to at least a minimum value $Tx_{min}$ based on the calculated path loss. Control then returns to other tasks via return block 129.

In block 128 control can determine $Tx_{min}$ according to the following properties and equations. RF power losses in the communication path can be described by:

$$PL = TxPwr - RSSI \quad (Eq. 3)$$

where PL is the path loss, in $dB_m$, that corresponds with TPC reply 134, TxPwr is the transmitter RF power indicated in TPC reply 134, and RSSI is indicated the receive signal strength indication corresponding to the message.

The link margin in the communication path can be described by:

$$\text{Link Margin} = RSSI_{TPCReq} - Rx\ \text{Sensitivity} \quad (Eq. 4)$$

where Link Margin is expressed in $dB_m$, $RSSI_{TPCReq}$ is a received signal strength indication at AP 102 (or another STA in an ad-hoc network) that corresponds to TPC request 132, and Rx Sensitivity is a minimum signal strength that receiver 62 is able to detect and demodulate with a desired degree of reliability.

Assuming a symmetric link, control can determine Rx Sensitivity based on:

$$Rx\ \text{Sensitivity} = TxREQ - \text{Path Loss} - \text{Link Margin}, \quad (Eq. 5)$$

where TxREQ is the transmitter RF power of STA 20. Control can then determine the minimum transmit power based on $$Tx_{min} = PL + Rx\ \text{Sensitivity} \quad (Eq. 6)$$

Control use the transmit power signal 40 to control the transmit power based on $Tx_{min}$. In some embodiments the actual transmit power is determined based on a sum of $Tx_{min}$ and a predetermined transmit power delta that is described below in more detail.

For a time varying channel or in a mobile environment, Path Loss will be a function of time. STA 20 can therefore execute a method, which is described below, to adapt $Tx_{min}$ according to changes in Path Loss.

Figure 6:
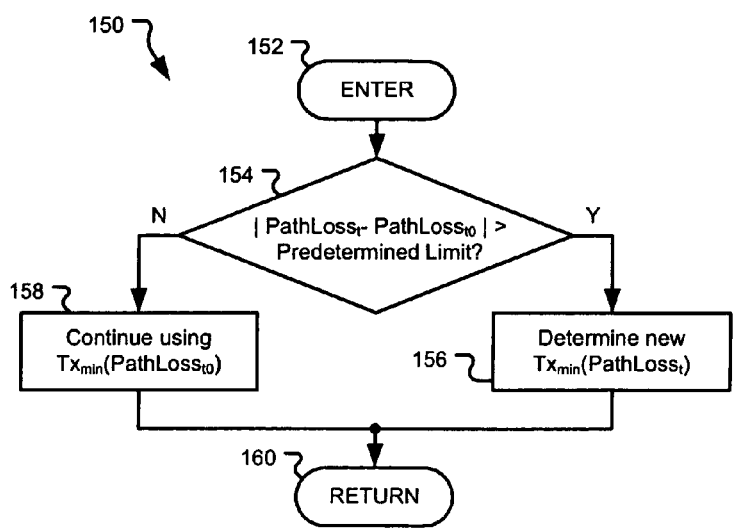
FIG. 6 is a flowchart of a method for determining a minimum transmit power.

Referring now to FIG. 6, a method 150 is shown for adjusting the minimum transmitter power $Tx_{min}$ of STA 20. Method 150 allows STA 20 to periodically adapt $Tx_{min}$ to changes in the path loss between STA 20 and the associated AP 102. Changes in path loss are commonly caused by STA 20 moving about within a coverage area of the associated AP 102. As the distance between the associated AP 102 and STA 20 reduces STA 20 can conserve energy by reducing $Tx_{min}$. As the distance between the associated AP 102 and STA 20 increases STA 20 can increase $Tx_{min}$ as little as possible to maintain reliable communication with the associated AP 102. Method 150 can be implemented as computer instructions in memory 38 and executed by CPU 36. Method 150 can be executed each time STA 20 receives a TPC reply 134 and/or beacon 130.

Method 150 enters through block 152 and proceeds to decision block 154. In decision block 154, control determines an absolute value of the difference between the present path loss ($PathLoss_t$) and the path loss associated with the present value of $Tx_{min}$ ($PathLoss_{t0}$). Control compares the absolute value to a predetermined path loss delta $\Delta_{PathLoss}$. If the absolute value is larger than $\Delta_{PathLoss}$ then control branches to block 156 and determines a new value of $Tx_{min}$ based on the present path loss. On the other hand, if the absolute value is less than $\Delta_{PathLoss}$ in decision block 154 then control branches to block 158 and continues using the present value of $Tx_{min}$. Control returns to other processes through return block 160 after completing the steps of blocks 156 and 158.

Figure 7:
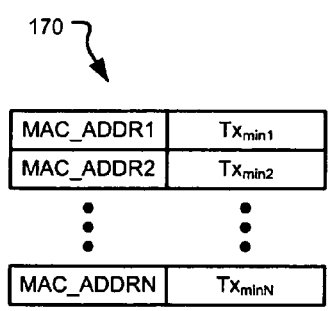
FIG. 7 is a memory map of an array of minimum transmit power values.

Referring now to FIG. 7 a memory map 170 is shown of an array of $Tx_{min}$ values. Such an array can be used when STA 20 is part of an ad-hoc network. An ad-hoc network consists of a plurality of STAs and does not include an AP 102. The plurality of STAs communicate only with each other and do not have access to DCS 14.

CPU 36 maintains memory map 170 in memory 38. Memory map 170 allocates memory for an identifier associated with each STA in the ad-hoc network. An example of an identifier includes a unique MAC address 172. Memory map 170 also allocates memory for a $Tx_{min}$ value associated with each identifier. In order for STA 20 calculate $Tx_{min}$ the other STA must use the TPC protocol. STA 20 can use a default value of $Tx_{min}$ for each STA that does not transmit the RF power data. STA 20 can adjust its transmit power each time it transmits a data frame to a recipient STA. The transmit power is based on the $Tx_{min}$ value associated with the recipient STA.

If STA 20 is not configured to modify transmit power on a per-frame basis then STA 20 can repeatedly use the transmit power corresponding to the maximum of the $Tx_{min}$ values computed for each of the STAs. Stated mathematically, $$Tx_{min} = \max\{Tx_{min1}, Tx_{min2}, \ldots, Tx_{minN}\} \quad \text{(Eq. 7)}$$

Figure 8:
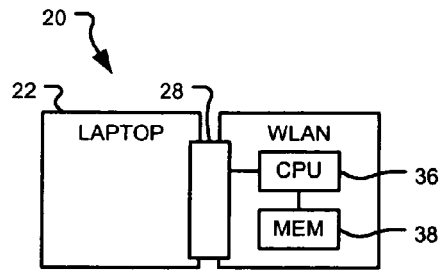
FIG. 8 is a functional block diagram of a STA that includes an application program interface (API)

Referring now to FIG. 8, a functional block diagram is shown of STA 20 wherein host 22 includes a laptop computer. Host 22 includes a CPU (not shown) that communicates with CPU 36 via interface 28. CPU 36 supports an application program interface (API) that is implemented in memory 38. The API provides a standard communication format for the values used and/or determined in the methods described above.

Referring now to FIG. 9A various messages of the API are shown in table form. The table of FIG. 9A shows command messages that host 22 sends to CPU 36. The table of FIG. 9B shows response messages that CPU 36 sends to host 22. With the exception of a Result field at row 216, the response messages of FIG. 9B are an echo of the command messages of FIG. 9A.

First column 201 indicates the name of each message. A second column 202 indicates a data type for each message. Data type "UINT16" indicates an unsigned 16-bit integer and data type "UINT8" indicates an unsigned 8-bit integer. Other data types can also be used to encode the message data. A third column 203 provides a description of each message.

The messages will now be described beginning with the top row 213. CmdCode is a fixed value that identifies the beginning of the API messages of FIG. 9A. At row 214, Size indicates a number of bytes in the API messages of FIG. 9A. At row 215, SeqNum provides a serial number for each transmitted group of API message. At row 216, Result is not used when host 22 sends the API messages to CPU 36. CPU 36 populates the Result field when CPU 36 sends the API results (FIG. 9B) to host 22.

Examples of operations that have an effect on the Result field will now be described. At row 217, Action indicates whether host 22 desires to enable or disable one or both of methods 120 and 150. At row 218, Transmit Power Delta indicates an additional amount of power that STA 20 desires to add to $Tx_{min}$. The additional power provides a margin for error when determining the path loss and $Tx_{min}$. At row 219, Path Loss Trigger Threshold indicates $\Delta_{PathLoss}$ that is used in block 154 of method 150. CPU 36 populates the Result field with an indication of whether it successfully executed the Action, Transmit Power Delta, and/or Path Loss Trigger Threshold commands from host 22.

Referring now to FIGS. 10A-10E, various exemplary implementations of the present invention are shown.

Figure 10A:
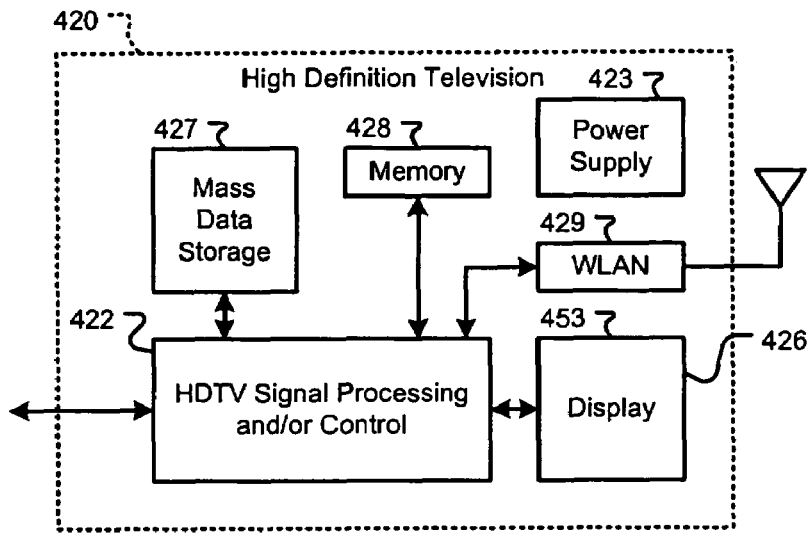
FIG. 10A is a functional block diagram of a high definition television.

Referring now to FIG. 10A, the present invention can be implemented in a high definition television (HDTV) 420. The present invention may be implemented in a WLAN interface 429. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. Mass data storage 427 can include at least one hard disc drive (HDD) and/or at least one optical digital versatile disc (DVD). The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via WLAN network interface 429. HDTV 420 can include a power supply 423.

Figure 10B:
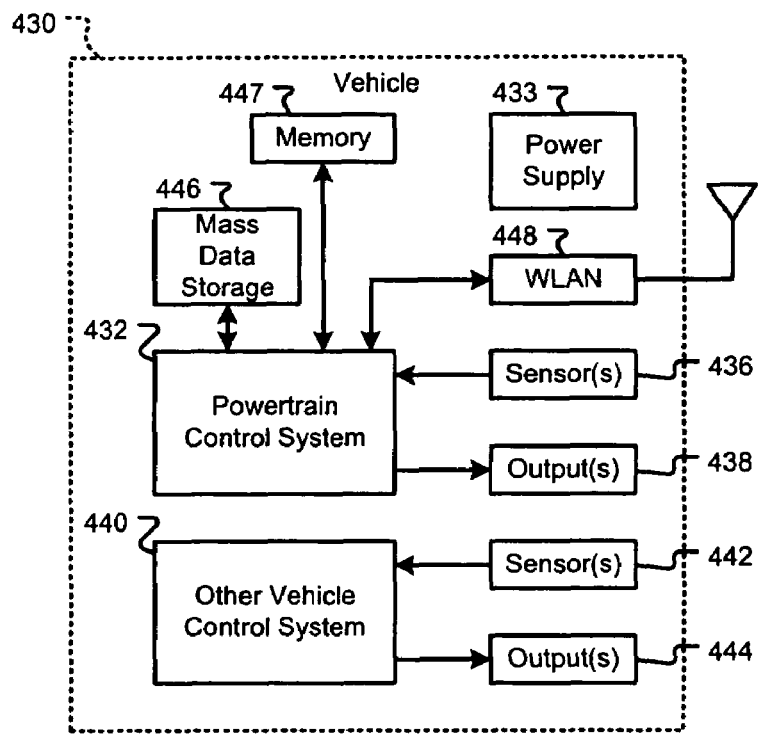
FIG. 10B is a functional block diagram of a vehicle control system.

Referring now to FIG. 10B, the present invention may be implemented in a WLAN interface 448 of a vehicle 430. Vehicle 430 can include a powertrain control system 432 that receives inputs from one or more sensors 436 such as temperature sensors, pressure sensors, rotational sensors, airflow sensors and/or any other suitable sensors and/or that generates one or more output control signals 438 such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. Mass data storage 446 can include at least one HDD and/or at least one DVD. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via WLAN network interface 448. The control system 440 may also include mass data storage, memory and/or a WLAN interface (all not shown). The vehicle 420 can also include a power supply 433.

Figure 10C:
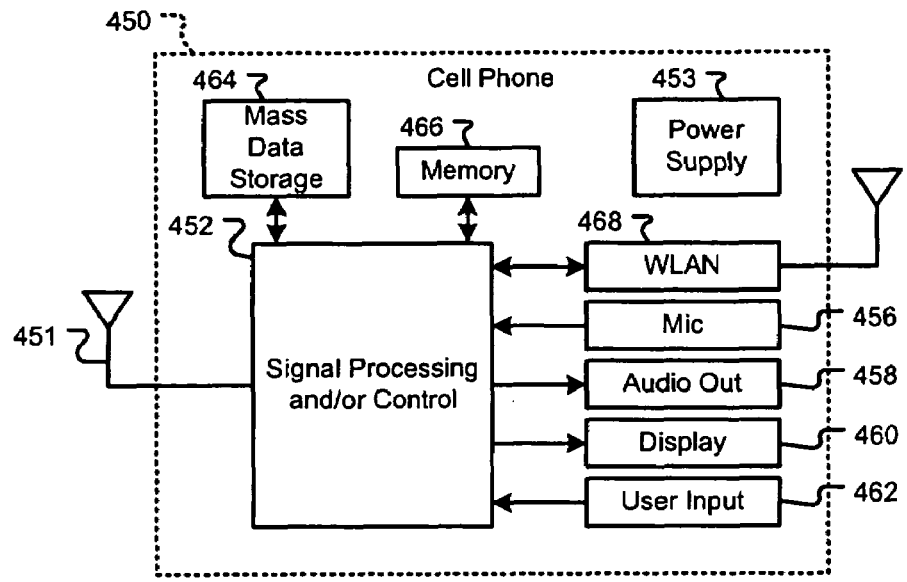
FIG. 10C is a functional block diagram of a cellular phone.

Referring now to FIG. 10C, the present invention can be implemented in a cellular phone 450 that may include a cellular antenna 451. The present invention may be implemented in a WLAN interface 468. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner. Mass data storage 464 can include at least one HDD and/or at least one DVD. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via WLAN network interface 468. The cellular phone 450 also may also include a power supply 453.

Figure 10D:
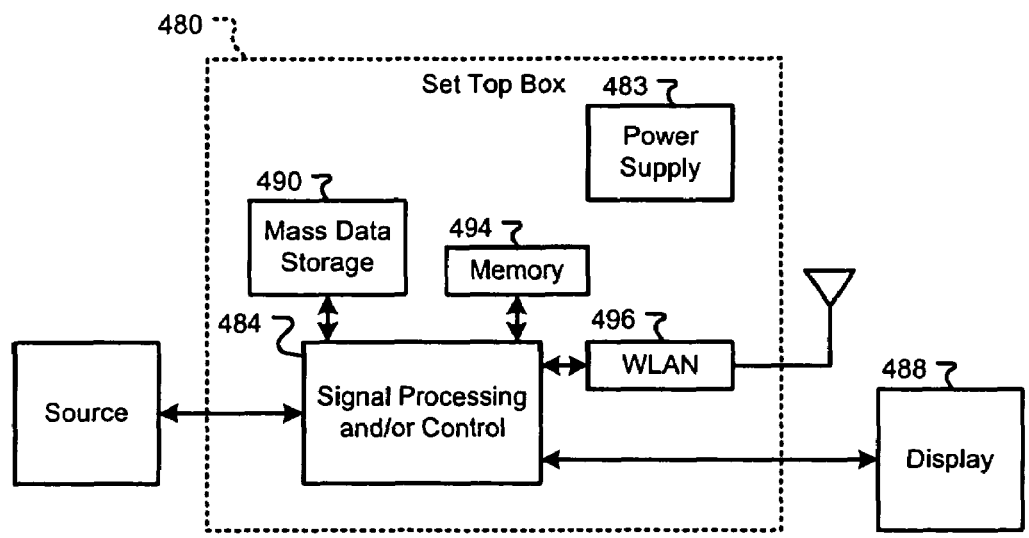
FIG. 10D is a functional block diagram of a set top box.

Referring now to FIG. 10D, the present invention can be implemented in a set top box 480. The present invention may be implemented in a WLAN interface 496. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. Mass data storage 490 can include at least one hard disc drive (HDD) and/or at least one optical digital versatile disc (DVD). The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via WLAN network interface 496. Set top box 480 can include a power supply 483.

Figure 10E:
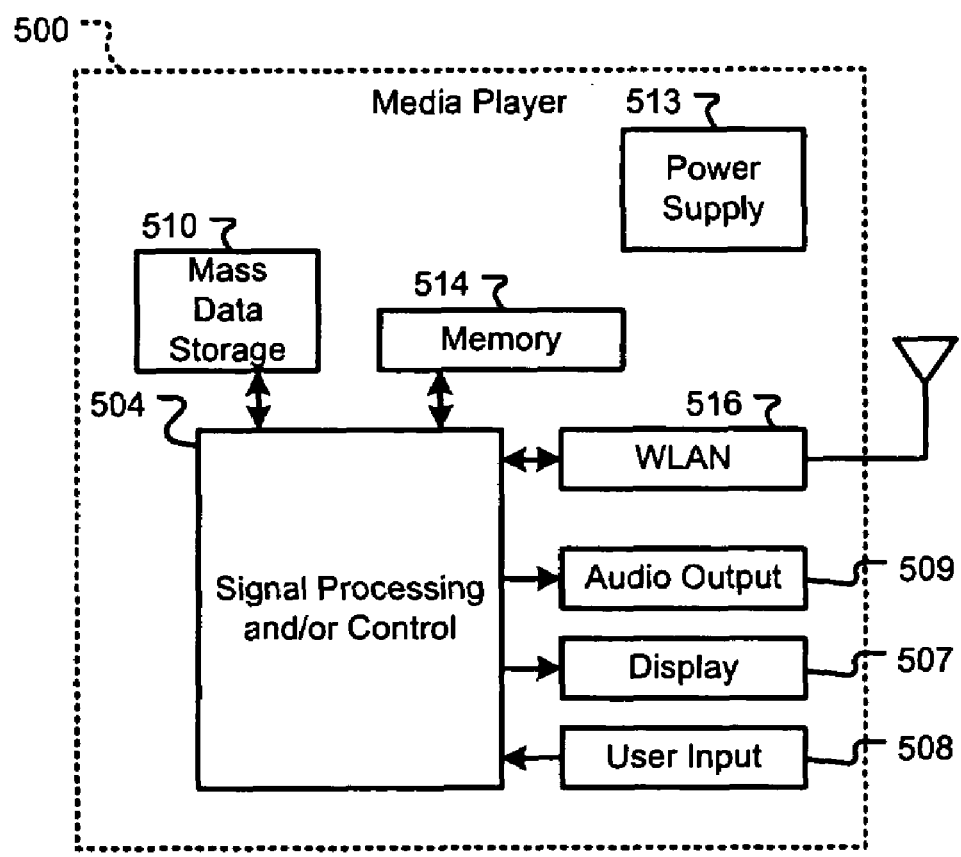
FIG. 10E is a functional block diagram of a media player.

Referring now to FIG. 10E, the present invention can be implemented in a media player 500. The present invention may be implemented in a WLAN interface 516. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. Mass data storage 510 can include at least one hard disc drive (HDD) and/or at least one optical digital versatile disc (DVD). The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via WLAN network interface 516. Media player 500 can include a power supply 513. Still other implementations in addition to those described above are contemplated.

What is claimed is:

1. A wireless client station, comprising:
   a received signal strength module to estimate N signal strengths of N signals received by the wireless client station from N access points, respectively, where N is an integer greater than one; and
   a control module to determine N path losses based on the N signal strengths and N transmit power signals included in the N signals,
   wherein the control module selects and associates with one of the N access points based on a lowest one of the N path losses, and
   wherein the control module adjusts a minimum transmit power of the wireless client station based on a sum of the lowest one of the N path losses and a receiver sensitivity of the wireless client station.

2. The wireless client station of claim 1 wherein the N path losses are based on corresponding ones of the N transmit power signals and the N signal strengths, respectively.

3. The wireless client station of claim 1 wherein the N transmit power signals are otherwise compliant with the Institute of Electrical and Electronics Engineers (IEEE) standard 802.11h.

4. The wireless client station of claim 1 wherein each of the N signal strengths is greater than a predetermined signal strength threshold.

5. A wireless network comprising:
   the wireless client station of claim 1; and
   the N access points,
   wherein the wireless client station communicates with the N access points using a transmit power control protocol.

6. The wireless client station of claim 1 further comprising a medium access control (MAC) module, wherein the control module is implemented by the MAC module.

7. The wireless client station of claim 1 further comprising:
a physical layer module that provides an interface with a wireless medium; and
a medium access control (MAC) module that communicates with the PHY module,
wherein the received signal strength module is implemented in at least one of the PHY module and the MAC module.

8. A method of operating a wireless client station, the method comprising:
estimating N signal strengths of N signals received by the wireless client station from N access points, respectively, where N is an integer greater than one;
determining N path losses based on the N signal strengths and N transmit power signals included in the N signals;
associating with one of the N access points based on a lowest one of the N path losses; and
adjusting a minimum transmit power of the wireless client station based on a sum of the lowest one of the N path losses and a receiver sensitivity of the wireless client station.

9. The method of claim 8 wherein the N path losses are based on corresponding ones of the N transmit power signals and the N signal strengths, respectively.

10. The method of claim 8 wherein the N transmit power signals are otherwise compliant with the Institute of Electrical and Electronics Engineers (IEEE) standard 802.11h.

11. The method of claim 8 wherein each of the N signal strengths is greater than a predetermined signal strength threshold.

12. The method of claim 8 further comprising communicating with the N access points via a transmit power control protocol.

13. A wireless client station, comprising:
received signal strength means for estimating N signal strengths of N signals received by the wireless client station from N access point means, respectively, where N is an integer greater than one; and
control means for determining N path losses based on the N signal strengths and N transmit power signals included in the N signals,
wherein the control means selects and associates with one of the N access point means based on a lowest one of the N path losses, and wherein the control means adjusts a minimum transmit power of the wireless client station based on a sum of the lowest one of the N path losses and a receiver sensitivity of the wireless client station.

14. The wireless client station of claim 13 wherein the N path losses are based on corresponding ones of the N transmit power signals and the N signal strengths, respectively.

15. The wireless client station of claim 13 wherein the N transmit power signals are otherwise compliant with the Institute of Electrical and Electronics Engineers (IEEE) standard 802.11h.

16. The wireless client station of claim 13 wherein each of the N signal strengths is greater than a predetermined signal strength threshold.

17. A wireless network comprising:
the wireless client station of claim 13; and
the N access point means,
wherein the wireless client station communicates with the N access point means using a transmit power control protocol.

18. The wireless client station of claim 13 further comprising:
physical layer (PHY) means for providing an interface with a wireless medium; and
medium access control (MAC) means for communicating with the PHY means,
wherein the received signal strength means is implemented in at least one of the PHY means and the MAC means.

* * * * *